United States Patent
Pearce et al.

(10) Patent No.: US 6,357,999 B1
(45) Date of Patent: Mar. 19, 2002

(54) GAS TURBINE ENGINE INTERNAL AIR SYSTEM

(75) Inventors: William J Pearce; Pauline Manchee, both of Bristol (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 09/464,598

(22) Filed: Dec. 16, 1999

(30) Foreign Application Priority Data

Dec. 24, 1998 (GB) ............................................. 9828665

(51) Int. Cl.$^7$ ................................................. F01D 5/18
(52) U.S. Cl. ...................................... 415/115; 415/175
(58) Field of Search ......................... 415/115; 416/97 R

(56) References Cited

U.S. PATENT DOCUMENTS

| | | | |
|---|---|---|---|
| 3,628,880 A | * 12/1971 | Smuland et al. | ............. 415/115 |
| 4,293,275 A | 10/1981 | Kobayashi et al. | |
| 4,616,976 A | * 10/1986 | Lings et al. | ............. 415/115 X |
| 4,767,261 A | * 8/1988 | Godfrey et al. | ............. 415/115 |
| 5,232,343 A | * 8/1993 | Butts | ............. 415/115 X |
| 5,601,399 A | * 2/1997 | Okpara et al. | ............. 415/115 |
| 5,669,759 A | * 9/1997 | Beabout | ............. 416/97 R |
| 5,993,156 A | * 11/1999 | Bailly et al. | ............. 416/96 A |
| 6,142,730 A | * 11/2000 | Tomita et al. | ............. 415/115 |
| 6,264,426 B1 | * 7/2001 | Fukuno et al. | ............. 415/115 |
| 6,290,462 B1 | * 9/2001 | Ishiguro et al. | ........... 416/97 R |

FOREIGN PATENT DOCUMENTS

| | | |
|---|---|---|
| EP | 0 034 961 A1 | 9/1981 |
| EP | 0 185 599 A1 | 5/1986 |
| GB | 1 359 983 | 7/1974 |
| GB | 2 127 105 A | 4/1984 |
| GB | 2 238 582 A | 6/1991 |

* cited by examiner

*Primary Examiner*—John E. Ryznic
(74) *Attorney, Agent, or Firm*—Oliff & Berridge, PLC

(57) ABSTRACT

In a gas turbine engine internal cooling system a high pressure turbine disc is cooled by an air flow directed at the face of the disc by nozzles formed in the inner platforms of the downstream guide vane annulus. A proportion of the cooling air collected in a plenum adjacent the disc is inducted into a second part of the vane internal cooling system is via a multi-pass system of passages is used to cool the vane internally and is exhausted through trailing edge apertures into the gas stream. Because of the variation of temperature and static pressure across the radial distance of the annular gas stream the air flow is metered internally and distribute between exit apertures along the height of the vane trailing edge to provide required cooling and exit flow.

13 Claims, 1 Drawing Sheet

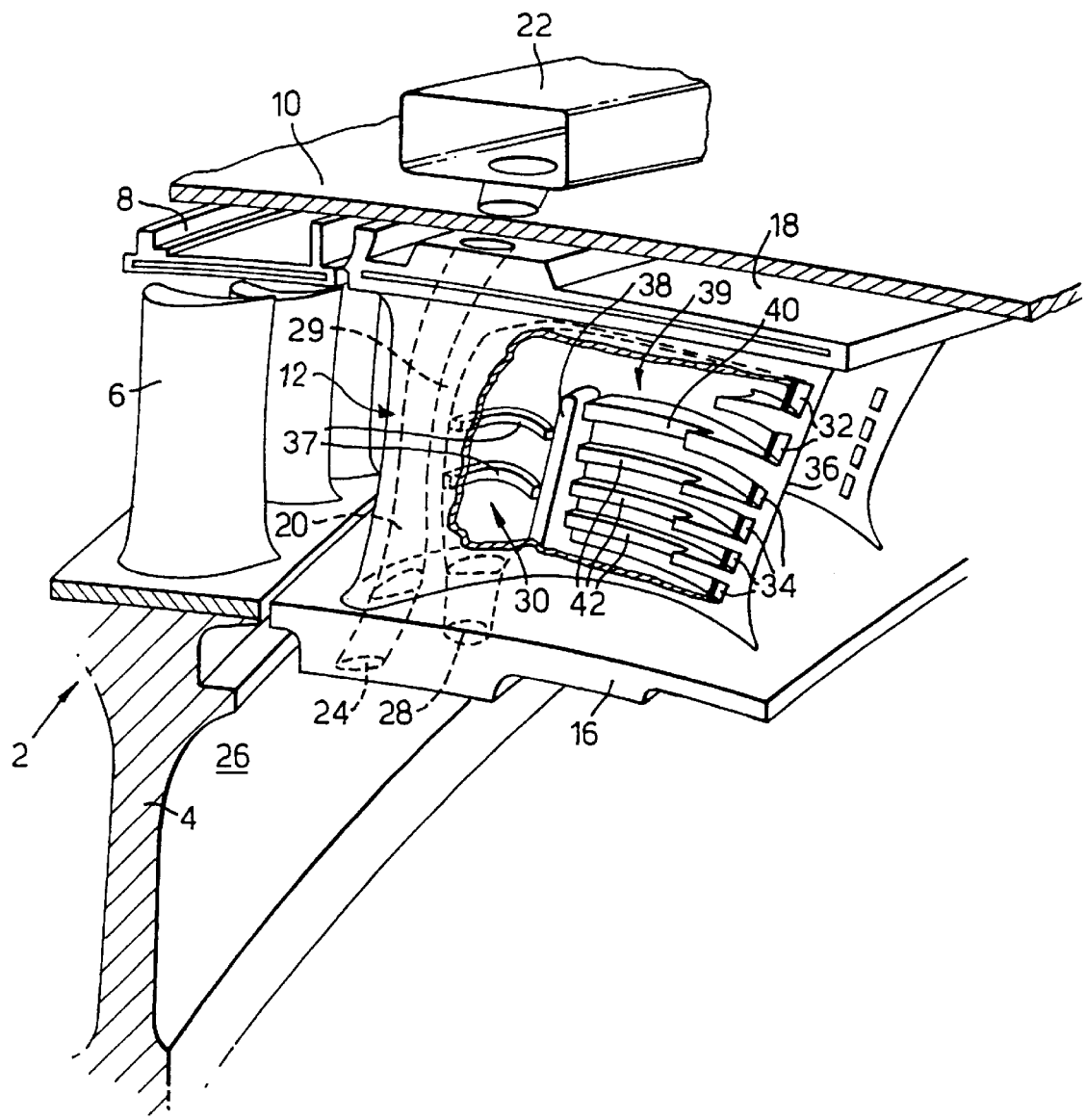

GAS TURBINE ENGINE INTERNAL AIR SYSTEM

BACKGROUND OF THE INVENTION

1. Field of the Invention

The invention relates to a gas turbine engine internal air system. In particular the invention concerns the control and distribution of internal cooling air in the guide vanes of a high pressure turbine section of a gas turbine propulsion engine.

2. Description of the Related Art

An engine internal air system has several important functions to perform for the safe and efficient operation of the engine. These include internal engine cooling, prevention of hot gas ingestion into the turbine disc cavities, cooling static and rotary components amongst others. Since an increasing amount of work is done on the air as it progresses through the compressor the air is usually taken as early as possible from the compressor commensurate with the requirements of each particular function. However in the case of cooling functions etc. in the region of a high pressure turbine the air is normally derived from a late stage of the compressor so that considerable work has been performed on it so it must be efficiently controlled and distributed in order to minimize performance losses.

In the HP turbine section cooling air is used to control the temperature of both static and rotative components, nozzle guide vanes and discs etc, by either cooling or heating them to ensure even temperature distribution to improve efficiency by controlling thermal growth. Thus blade tip and seal clearances may be maintained at optimum dimensions to maximize efficiency. High thermal efficiency requires high turbine entry temperature and heat conduction from the turbine blades into the turbine disc requires the disc to be cooled to prevent thermal fatigue and to control expansion and contraction rates and nozzle guide vanes must also be cooled internally. A particular problem arises in the HP turbine where in the latest generation of engines particular attention is paid to cooling the first stage disc and the immediately following nozzle guide vane annulus. These NGV's incorporate trailing edge film cooling apertures so that internal distribution of cooling air inside the NGV is important as well as controlling the flow of air through the exit apertures into the gas path.

SUMMARY OF THE INVENTION

According to one aspect of the present invention a gas turbine engine internal air system including a multi-pass cooling arrangement for airfoil members in a non-rotary turbine stage wherein, in use, cooling flow from a source of cooling fluid flow is directed through a first passage in each of the airfoil members into a plenum adjacent a disc of a neighbouring rotary stage, and the airfoil members are each formed with a second internal cooling passage including an entry orifice communicating with the plenum and a number of exit apertures at least one of which receives cooling flow from the second cooling passage via fluid flow restricting means which restricts fluid flow through said aperture relative to at least one other of the exit apertures.

BRIEF DESCRIPTION OF THE DRAWING

The invention will now be described in greater detail with reference, by way of example only, to an embodiment illustrated in the accompanying drawing.

DETAILED DESCRIPTION OF THE PREFERRED EMBODIMENTS

Referring now to the drawing there is shown at 2 a high pressure (HP) turbine rotor assembly comprising a disc 4 which carries a multiplicity of HP turbine blades, one of which is indicated at 6, spaced apart circumferentially around its outer periphery. In the particular example this is a shroudless turbine stage so that a series of shroud liner segments 8 are arranged circumferentially end-to-end around the interior of a turbine casing 10 encircling the rotor assembly. A clearance distance is maintained between the tips of turbine blades 6 and the inner circumferential surface of liner segments 8 by means of a tip control clearance system not shown in the drawing, and which is not of concern to the present invention.

Immediately downstream of the HP turbine stage there is an annular array of HP turbine nozzle guide vanes, of which one is indicated at 12, partly cutaway to reveal its internal cooling system. A multiplicity of such NGV's 12 are arranged in part circumferential segments between inner and outer segmented annular platforms 16, 18 respectively in end-to-end relationship around the annular gas path. Each NGV has an internal cooling system divided into two parts: the first part comprises a leading edge passage 20 which receives a radially inward flow of cooling air from a manifold 22 encircling the annular stator stage and directs it into an inner plenum, and a second multi-pass part which receives air from the plenum and exhausts it into the gas stream.

Cooling air in manifold 22 is derived from a bleed (not shown) in the HP compressor section of the engine and is first used for cooling the guide vane leading edge passages 20 because of their relatively high temperature. This first pass of the cooling air is ducted radially inwards from manifold 22 through the engine casing 10 into radially outer ends of each the guide vane passages 20. The cooling air passes down the leading edge passage 20 in a radially inward direction and exits, through a pre-swirl exit nozzle 24 formed in the inner NGV platform 16, into an inner plenum chamber 26 adjacent the rear face of HP turbine disc 4. The pre-swirl nozzles 24 are angled so as to direct air at the rear face of disc 4 with a Circumferential component of swirl matching the rotation of the disc, at least partially, in order to minimize energy input to the air.

Plenum 26 acts as a source of internal air for several functions. Roughly half of the air flow through the plenum 26 is drawn into the second part of the internal cooling system of the NGV's 12. The air is drawn from plenum 26 through a series of straight, i.e. radial, entry apertures 28 formed in the underside of inner platforms 16 into an internal passage 30 in the interior of the NGV.

Relative to the direction of flow in the gas path this passage 30 is behind the leading edge passage 20, in a downstream direction, and separated therefrom by dividing wall 29 on its upstream side. The passage 30 leads in the downstream into a trailing edge cavity 39 in flow communication with exit apertures 32,34 towards the trailing edge 36 of the vane which exhaust into the gas stream. The passage 30 is defined on its downstream side by a radially outward extending internal wall 38 which extends circumferentially between the side walls of the internal cavity and radially part way from inner platform 16 towards outer platform 18. Over the radially outer end of internal wall 38 there is thus defined a throat through which internal air passes into the trailing edge cavity 39. A plurality of substantially parallel, longitudinally extending ribs 40,42 which extend between the downstream side of the radial wall 38 and the trailing edge of the cavity 39. The first, radially outer rib 40, near to or at the tip of wall 38, acts as an air flow metering means and partitions the trailing edge exhaust apertures into an outer group 32 and a radially inner group 34. Further ribs 42, substantially parallel to rib 40, extend longitudinally from internal wall 38 towards the downstream limit of the internal cavity 39.

Temperature and pressure conditions are not uniform in the annular gas path. It is found that, generally speaking, gas path temperatures are highest towards the radially outer regions but that static pressure head of the gas stream is lowest towards the radially inner regions. As a result therefore, the exit apertures 32,34 are best sized accordingly to take account of where extra cooling air is required, and where flow is best restricted to avoid unfavourable flow bias. The two groups of exit apertures 32,34 are thus fed internally with cooling air through a distribution system, utilising the internal ribs 40,42, which takes account of the varying gas path pressures and temperatures. The first, radially outer rib 40 which extends from wall 38 to the trailing edge 36 and partitions the apertures of differing sizes thereby functioning as a flow metering rib to limit flow to the radially inner apertures 34 in the region of lowest gas path pressures. Flow through the larger apertures 32 is determined by the total area of the apertures and the pressure drop between the cavity 39 upstream of the rib 40 and the gas stream in the vicinity of the radially outer region of the gas path. Flow through the smaller apertures 34 is determined by the total area of the aperture and the pressure drop between the cavity 39 downstream of the rib 40 and the gas stream in the vicinity of the radially inner region of the gas path.

The further ribs 42 are used in the illustrated embodiment for cooling enhancement by increasing the surface area of the internal cavity in contact with cooling flow thereby enhancing heat absorption in the region of the lower cooling flow. The metering effect of the rib 40 and the total areas of the cooling flow exit apertures 32,34 are balanced to produce a required cooling effect. The further cooling ribs 42 may serve a secondary metering function to distribute exit flow between the remaining exit apertures.

In the embodiment illustrated, and being described, the internal passage 30 has several internal cooling enhancement ribs 37 which, as previously mentioned, increase the internal surface area of the cooling passage exposed to cooling flow. As shown these ribs 37 are formed as internal collars but other configurations may be chosen to suit a particular vane and operating environment. Similarly in other embodiments the size, shape, number etc. of cooling exit apertures and flow distributing metering ribs may be selected as appropriate. Also, although the flow restricting means in the illustrated embodiment comprises a metering rib other ways of metering flow may be employed, for example, a flange pierced by at least one aperture may be used, the size of the aperture or apertures producing the required pressure drop and maximum flow rate.

What is claimed is:

1. An airfoil member for use with a gas turbine engine that includes an exterior side, an interior side, a disc disposed at the interior side, a turbine blade disposed on the disc, and a plenum defined adjacent the disc, the airfoil member being disposed adjacent the turbine blade, the airfoil member comprising:

a first cooling air passage having an entry orifice at the exterior side and an exit orifice to direct cooling air into the plenum; and a second cooling passage having an entry orifice that communicates with the plenum, a fluid flow restricting device, and a plurality of exit apertures, the fluid flow restricting device restricting fluid flow through at least one exit aperture of the plurality of exit apertures relative to at least one other exit aperture of the plurality of exit apertures.

2. A gas turbine engine, comprising:

a disc;

a turbine blade disposed on the disc;

a plenum defined adjacent the disc; and an airfoil member adjacent the turbine blade, the airfoil member defining a first cooling air passage having an exit orifice to direct cooling air into the plenum, the exit orifice being angled in a direction toward the disc so as to direct cooling air toward the disc, the airfoil member also defining a second cooling air passage having an entry orifice that communicates with the plenum, a fluid flow restricting device, and a plurality of exit apertures, the fluid flow restricting device restricting fluid flow through at least one exit aperture of the plurality of exit apertures relative to at least one other exit aperture of the plurality of exit apertures.

3. The gas turbine engine according to claim 2, the exit orifice of the first cooling air passage being angled so as to direct cooling air toward the disc with a circumferential component of swirl substantially matching rotation of the disc.

4. A gas turbine engine, comprising:

a disc;

a turbine blade disposed on the disc;

a plenum defined adjacent the disc;

means for providing a source of cooling air;

an airfoil member adjacent the turbine blade, the airfoil member defining a first cooling air passage having an entry orifice disposed at the means for providing a source of cooling air and an exit orifice to direct cooling air into the plenum, the airfoil member also defining a second cooling air passage having an entry orifice that communicates with the plenum, a fluid flow restricting device, and a plurality of exit apertures, the fluid flow restricting device restricting fluid flow through at least one exit aperture of the plurality of exit apertures relative to at least one other exit aperture of the plurality of exit apertures.

5. The gas turbine engine according to claim 4, the means for providing a source of cooling air including a manifold.

6. A gas turbine engine, comprising:

an exterior side;

an interior side;

a disc disposed at the interior side;

a turbine blade disposed on the disc;

a plenum defined adjacent the disc; and an airfoil member adjacent the turbine blade, the airfoil member defining a first cooling air passage having an entry orifice at the exterior side and an exit orifice to direct cooling air into the plenum, the airfoil member also defining a second cooling air passage having an entry orifice that communicates with the plenum, a fluid flow restricting device, and a plurality of exit apertures, the fluid flow restricting device restricting fluid flow through at least one exit aperture of the plurality of exit apertures relative to at least one other exit aperture of the plurality of exit apertures.

7. The gas turbine engine as claimed in claim 1, wherein the airfoil member defines a trailing edge, and the plurality exit apertures are located in the trailing edge of the airfoil member.

8. The gas turbine engine as claimed in claim 1, wherein the fluid flow restricting device comprises an internal orifice restriction.

9. The gas turbine engine as claimed in claim 8, wherein the internal orifice restriction is formed in a flow passage by a restricting member in close proximity to an adjacent passage wall.

10. The gas turbine engine as claimed in claim 9, wherein the restricting member comprises a cooling enhancement rib extending across the interior of the second cooling air passage.

11. The gas turbine engine as claimed in claim 1, further comprising part of a multi-pass internal cooling system for a nozzle guide vane.

12. The gas turbine engine as claimed in claim 1, further including a source of cooling fluid flow that provides cooling fluid flow to the first cooling air passage of the airfoil member.

13. The gas turbine engine as claimed in claim 1, wherein the airfoil member is a non-rotary stator blade.

* * * * *